United States Patent [19]
Lundeby

[11] Patent Number: 5,263,162
[45] Date of Patent: Nov. 16, 1993

[54] METHOD OF VALIDATING A LABEL TRANSLATION CONFIGURATION BY PARSING A REAL EXPRESSION DESCRIBING THE TRANSLATION CONFIGURATION

[75] Inventor: Bruce A. Lundeby, Colorado Springs, Colo.

[73] Assignee: Hewlett-Packard Company, Palo Alto, Calif.

[21] Appl. No.: 610,486

[22] Filed: Nov. 7, 1990

[51] Int. Cl.$^5$ .............................................. G05F 15/38
[52] U.S. Cl. ................................ 395/700; 364/DIG. 2; 364/226.4; 364/280.4; 364/973; 364/977.5; 364/920.4
[58] Field of Search ......................... 395/700; 364/419

[56] References Cited
U.S. PATENT DOCUMENTS
4,729,096 3/1988 Larson ................................ 395/700

OTHER PUBLICATIONS

Aho, Alfred et al., "Compilers: Principles, Techniques and Tools" pp. 92–105 and 113–158, Addison-Wesley Publishing Company, Mar. 1988 (ISBN 0-201-100-88-6).
Jones, D. S., "Elementary Information Theory", chp. 2, Oxford University Press, 1979 (ISBN 0-19-859637-5).
Tanenbaum, Andrew S., "Computer Networks", chp, 4, Prentice Hall, Inc., 1981, (ISBN 0-13-165183-8).
McNamara, John S., "Technical Aspects of Data Communication", chp. 17, 18, Digital Press, 1977 (ISBN 0-932376-01-0).

Primary Examiner—Thomas C. Lee
Assistant Examiner—Peter Y. Wang

[57] ABSTRACT

A method of validating a label translation configuration file (TC) is disclosed. Once the validity of a TC is verified, a set of test case characters (Test Set) is automatically generated if requested by the user.

13 Claims, 6 Drawing Sheets

METHOD OF VALIDATING A LABEL TRANSLATION CONFIGURATION BY PARSING A REAL EXPRESSION DESCRIBING THE TRANSLATION CONFIGURATION

FIELD OF THE INVENTION

The present invention relates generally to the field of computer compilers and translators. More particularly, the present invention relates to a method of validating label translation configurations in label translators used in compilers and translators.

BACKGROUND OF THE INVENTION

In the context of computer compilers and translators, a "label" is generally defined as a string of characters. A label translator is a software tool (computer program) employed by compilers and translators for translating valid labels from a "source" language into valid labels in a "target" language.

One example of where label translation is necessary is when a computer aided engineering (CAE) product, e.g., a software circuit board description, must be integrated with an altogether different software system having a compiler that employs different labels than those used in the circuit board description. A problem arises when a label that is valid in one system (e.g., the source system) is not valid in another (e.g., the target system), for example, when the label contains a character that is illegal in the target language. When this occurs, the offending character(s) must be either mapped (in a one-to-one manner) into valid characters in the target system, thereby forming a valid label in the target system, or replaced with an "escape sequence" consisting of an "escape character" followed by a sequence of other characters. The escape sequence is also known as an "expansion sequence". Typically, the escape and expansion characters are specified by the system user or application developer.

Methods of performing label translation are well known in the art. See, e.g., Aho, Alfred et al., "COMPILERS: Principles, Techniques and Tools," pp. 92-105 and 113-158, Addison-Wesley Publishing Company, March 1988 (ISBN 0-201-10088-6); Jones, D. S., "Elementary Information Theory," chp. 2, Oxford University Press, 1979 (ISBN 0-19-859637-5); Tanenbaum, Andrew S., "Computer Networks," chp, 4, Prentice Hall, Inc., 1981, (ISBN 0-13-165183-8); and, McNamara, John S., "Technical Aspects of Data Communication," chp. 17, 18, Digital Press, 1977 (ISBN 0-932376-01-0), all of which are incorporated herein by reference. Until recently, label translators had been manually constructed. Recently, however, tools have been developed for automatically constructing label translators based upon descriptions of valid target language labels provided by the user. In one automatic label translator generator, the user-provided description is contained in a file called a Translation Configuration (TC). As discussed more fully below, the TC contains, among other things, a description of valid labels recognized by the target language. This description is in regular expression (RE) format. The TC is read by the translator generator, which then parses the TC and produces a state machine (SM) representation of the REs. Such a method is described in the aforementioned Aho et al. reference entitled "Compilers; Principles, Techniques, and Tools."

FIG. 1 illustrates the overall process involved in automatically generating a label translator as known in the prior art. A user-defined TC, 1, is read by the translator-generator program, as shown at 3. The translator-generator program converts the RE description in the TC into an SM. The SM is output to an SM file as shown at 5. At this point, the work of the translator-generator 3 is completed. The SM file 5 is read by a general translation implementation program, as shown at 7, which performs the actual translation of source language labels into target language labels, as shown at 8 and 9.

A problem with these label translator generator programs is that, unbeknownst to the user, the user-specified escape and/or expansion characters are sometimes inappropriate, or even invalid in certain situations. The user of such a program, who is usually not an expert in the art of label translation, does not become aware of the problem until compilation or translation is attempted, and one or more error messages are provided. The user must then revise the escape and/or expansion characters in the TC and rerun the source program through the compiler. The process might be an iterative one that is time consuming and inefficient.

It is therefore desirable to provide a method for use in connection with an automatic label translator that will minimize the errors and time required in generating a valid set of escape and/or expansion characters. The present invention achieves this goal.

Before proceeding to a description of the present invention, it is helpful to define some relevant terms employed in connection with label translation. It should be understood that these definitions are provided solely for the purpose of providing a complete understanding of the invention, and should not be construed as limiting the scope of the invention in any respect, except as may be recited by the appended claims.

Escape Sequence Encoding. Translators which employ escape sequence encoding convert illegal characters into an escape sequence containing the escape character followed by, for example, a group of "digit" characters. This sequence of digit characters represents the numeric value of the illegal source label character. The escape and digit characters are specific to the target language. Therefore, the escape character will often not be the ASCII value 27 (i.e., the ASCII escape character), since that character is not a valid character in most languages. In addition, the digit characters are not necessarily limited to "0" through "9".

As an example of how escape sequence encoding works, assume that the escape character is defined as "X" and the digit characters are "0" through "9". If the target language alphabet only contains the characters "A" through "Z" and "0" through "9", the label AB"CD would be translated to ABX034CD, where 034 is the ASCII value (in decimal) for a quotation mark (").

Valid Label Specification. Production of legal labels from a translation requires definition of the legal labels in the target language. For example, most languages allow the characters "0" through "9" to be used in labels, but not as the first characters. To allow as much latitude as possible, regular expression (RE) notation is generally used to describe legal labels.

Since label length is limited in many languages, the maximum label length may be specified in the TC. In addition, particular reserved words, or "keywords", may also be specified to ensure that these labels are not generated by the translator. Together, all of this data forms the valid label specification.

Translation Configuration (TC) File. The TC file has been previously explained. An exemplary TC file is presented below. The target language for this example is VHDL (a hardware description language). Note that comments in the TC file are preceded by the characters "//". In this example, the statements "target", "label", "length", and "keywords" are required to appear in the TC and the "escape" and "digits" statements are optional.

The "target" statement specifies the name of the target language. This string is used to produce appropriate names for files in the generated translator source code. The "label" statement defines the syntax of valid labels in the target language. The form of this statement is a RE. The "length" statement specifies the maximum label length allowed in the target language. The length can be specified as either "UNLIMITED" or a decimal number.

The "escape" statement specifies the character to be used for indicating the start of an escape sequence. The "digits" statement specifies the numeral characters to be used to represent the numeric values of illegal characters in escape sequences. The "keywords" statement (under "reserved words") specifies the labels which must not be generated by the translator.

SUMMARY OF THE INVENTION

A method according to the present invention validates a TC that describes, in regular expression format, a valid label in the target language. According to the invention, a state machine derived from the regular expression is employed to translate a label from a source language to a target language. Characters in a source language label which are found to be illegal in the target language by the RE are converted into sequences of an escape character followed by one or more digit characters. These sequences are known to be valid due to the invention's analysis.

The method of the present invention comprises the steps of first parsing the TC and converting the regular expression into a state machine, and then analyzing the TC, through the state machine, to determine the validity of the TC. According to the invention, the TC is invalid if the state machine is left in an undefined state during the analysis.

One preferred embodiment of the invention further comprises the step of automatically generating a set of test labels, or a "test set", for testing the label translator.

A most preferred embodiment of the invention further comprises the step of determining sets of escape and digit characters which, when used in a TC for the same target language, are known to produce a valid TC.

EXAMPLE

```
//Exemplary Configuration File for Translation to VHDL
//This configuration file for VHDL was derived from the
//"IEEE Standard VHDL Language Reference Manual" (IEEE Std 1076-
//1987) published March 31, 1987. References to sections in this
//configuration file indicate the relevant sections of that
//manual.
target = "VHDL";
// Section 13.3 -- Definition of "identifier"
// Note that although upper and lower case are valid, they are
// considered equivalent. Therefore, only one case should be
// used (upper).
label = [A-Z] ([_]? [A-Z0-9])*;
// Section 13.3 -- "All characters of an identifier are
// significant, . . ."
length = UNLIMITED;
// The selected escape character (always valid but not common).
// Note that "_" is not valid (can't be first character).
escape = Z;
// The selected expansion number system (hex is easy to
// understand)
digits = "0123456789ABCDEF";
// Section 13.9 -- "Reserved Words"
keywords =
```

| | | | |
|---|---|---|---|
| "ABS", | "ACCESS", | "AFTER", | "ALIAS", |
| "ALL", | "AND", | "ARCHITECTURE", | "ARRAY", |
| "ASSET", | "ATTRIBUTE", | "BEGIN", | "BLOCK", |
| "BODY", | "BUFFER", | "BUS", | "CASE", |
| "COMPONENT", | "CONFIGURATION", | "CONSTANT", | "DISCONNECT", |
| "DOWNTO", | "ELSE", | "ELSIF", | "END", |
| "ENTITY", | "EXIT", | "FILE", | "FOR", |
| "FUNCTION", | "GENERATE", | "GENERIC", | "GUARDED", |
| "IF", | "IN", | "INOUT", | "IS", |
| "LABEL", | "LIBRARY", | "LINKAGE", | "LOOP", |
| "MAP", | "MOD", | "NAND", | "NEW", |
| "NEXT", | "NOR", | "NOT", | "NULL", |
| "OF", | "ON", | "OPEN", | "OR", |
| "OTHERS", | "OUT", | "PACKAGE", | "PORT", |
| "PROCEDURE", | "PROCESS", | "RANGE", | "RECORD", |
| "REGISTER", | "REM", | "REPORT", | "RETURN", |
| "SELECT", | "SEVERITY", | "SIGNAL", | "SUBTYPE", |
| "THEN", | "TO", | "TRANSPORT", | "TYPE", |
| "UNITS", | "UNTIL", | "USE", | "VARIABLE", |
| "WAIT", | "WHEN", | "WHILE", | "WITH", |
| "XOR"; | | | |

An important feature of the invention is that the TC analysis is performed on the SM equivalent of the regular expression rather than on the regular expression itself.

DETAILED DESCRIPTION OF THE PREFERRED EMBODIMENT

Figure 1:
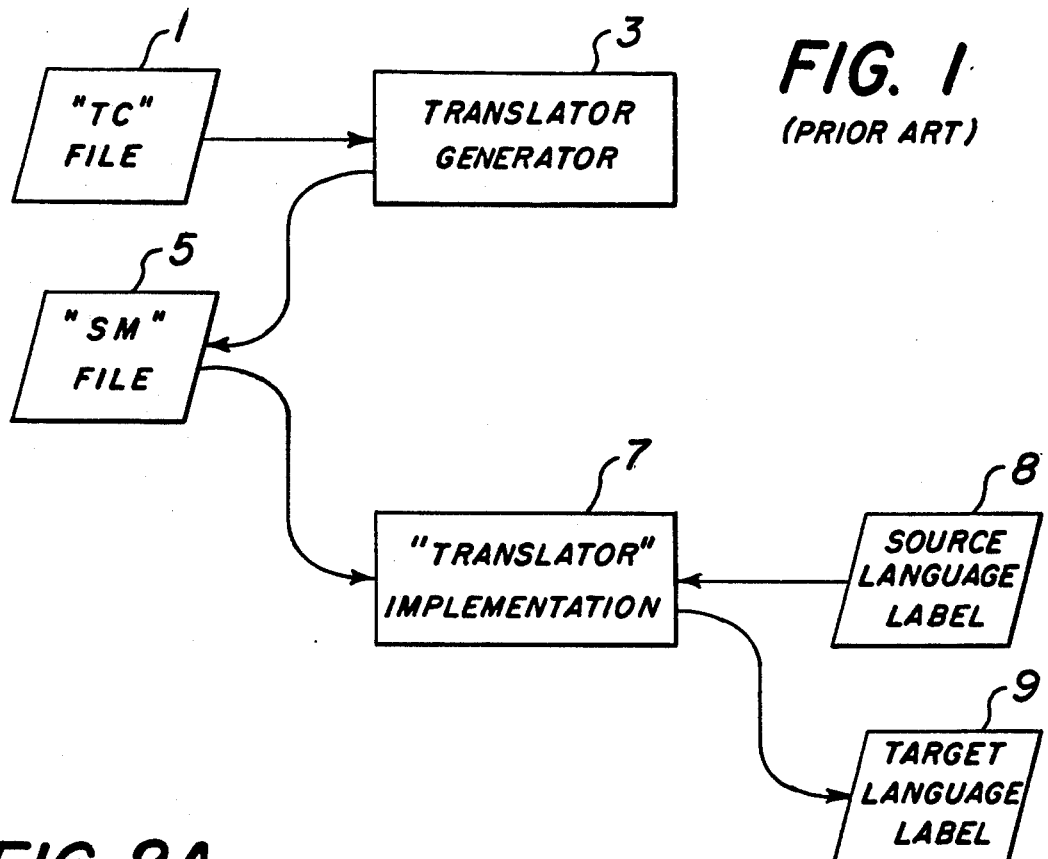
FIG. 1 is a simplified flowchart illustrating a method of automatically generating a label translator according to the prior art.
Figure 2A:
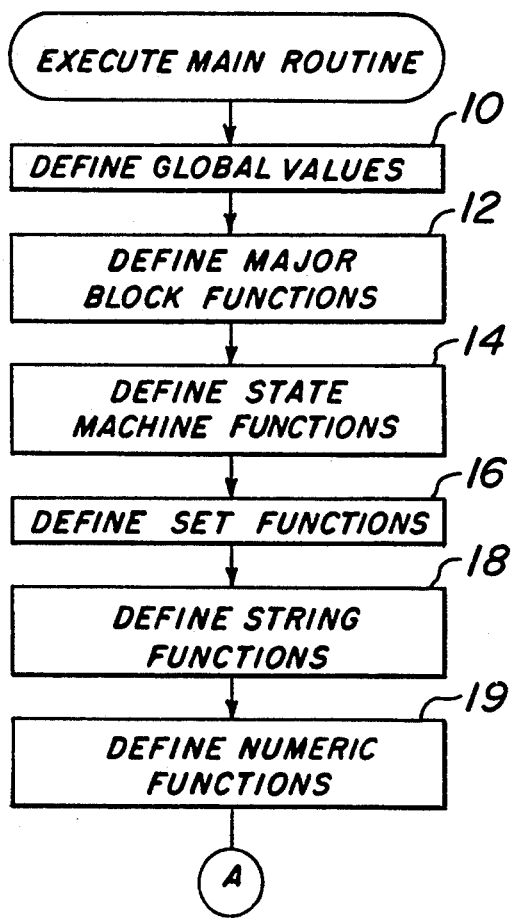
FIGS. 2A and 2B are a simplified flowchart of a main routine ("Main") for analyzing a translation configuration (TC) and generating a test set according to the invention.
Figure 2B:
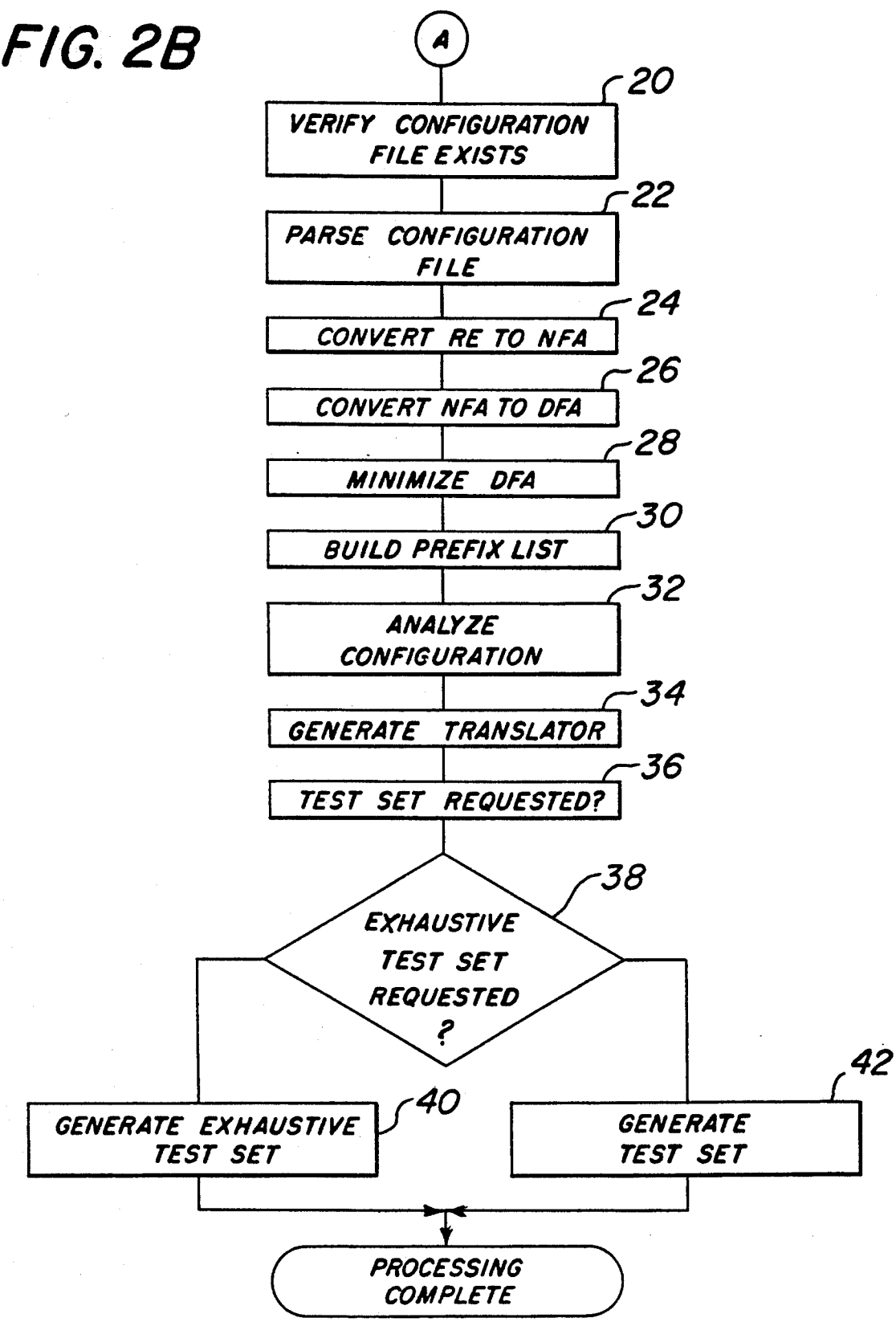

The invention is most preferably carried out by a programmed computer. In the preferred embodiment, a computer program according to the invention comprises several modules each of which performs a particular function within the context of the invention. The detailed description is therefore organized as follows, with like numerals representing like elements:

Section A describes the "Main" routine illustrated in the flowchart of FIGS. 2A and 2B. Exemplary pseudo code for Main is provided in Appendix A.

Figure 3:
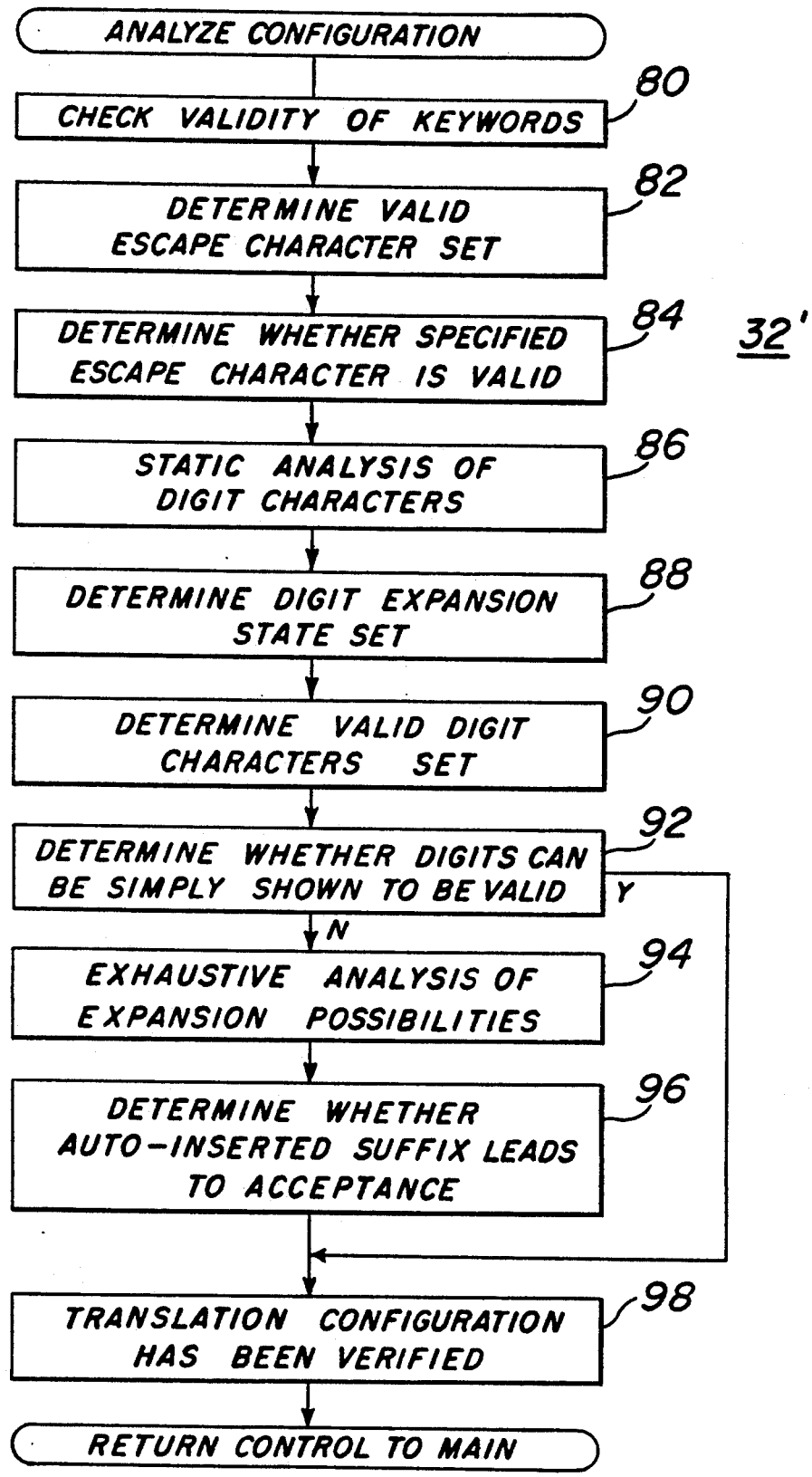
FIG. 3 is a simplified flowchart of the "Analyze Configuration" block of FIG. 2B.

Section B describes the "Analyze Configuration" routine illustrated in the flowchart of FIG. 3. Corresponding exemplary pseudo code is provided in Appendix B.

Figure 4:
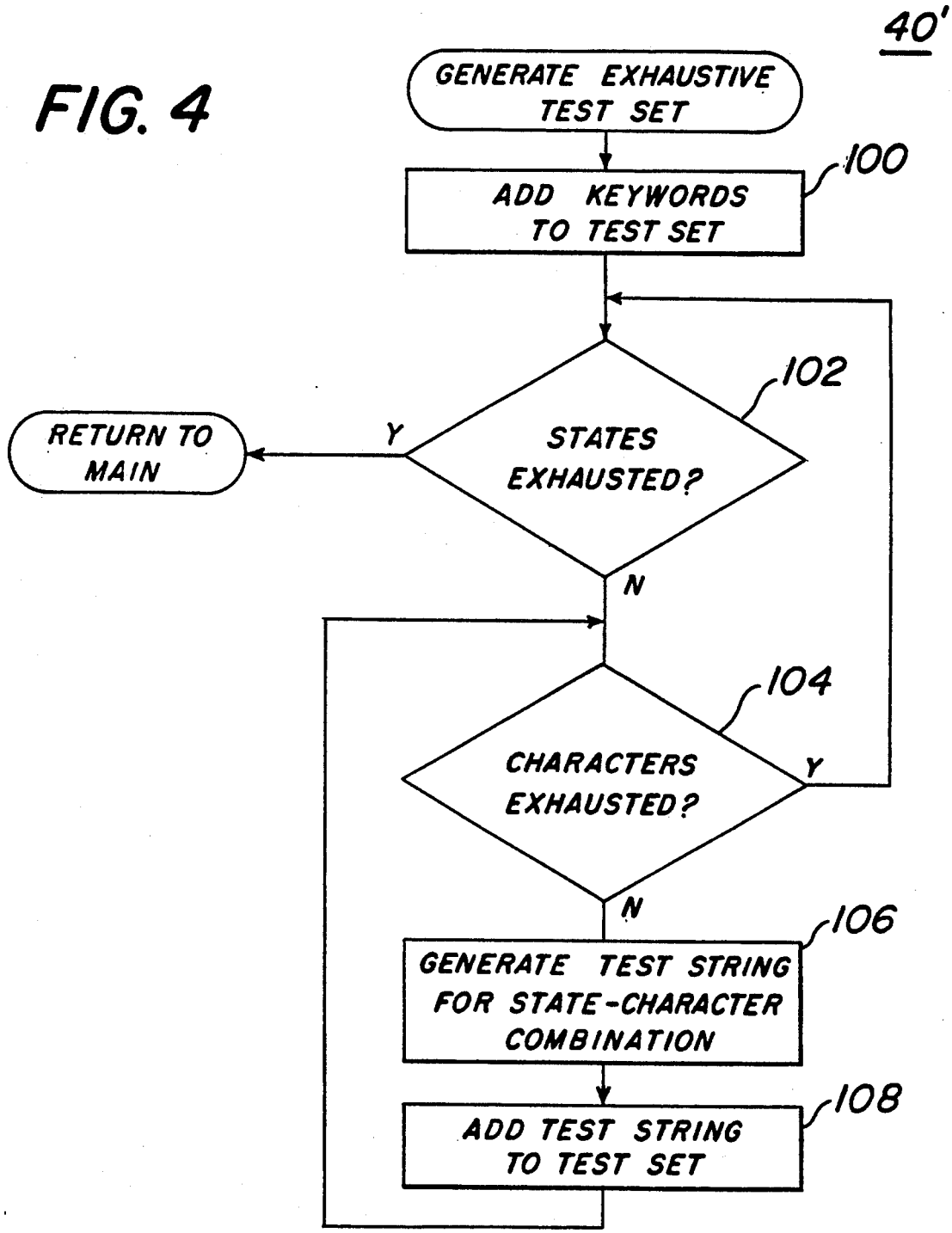
FIG. 4 is a detailed flowchart of the "Generate Exhaustive Test Set" block of FIG. 2B.

Section C describes the "Generate Exhaustive Test Set" routine illustrated in FIG. 4. Corresponding exemplary pseudo code is provided in Appendix C.

Figure 5:
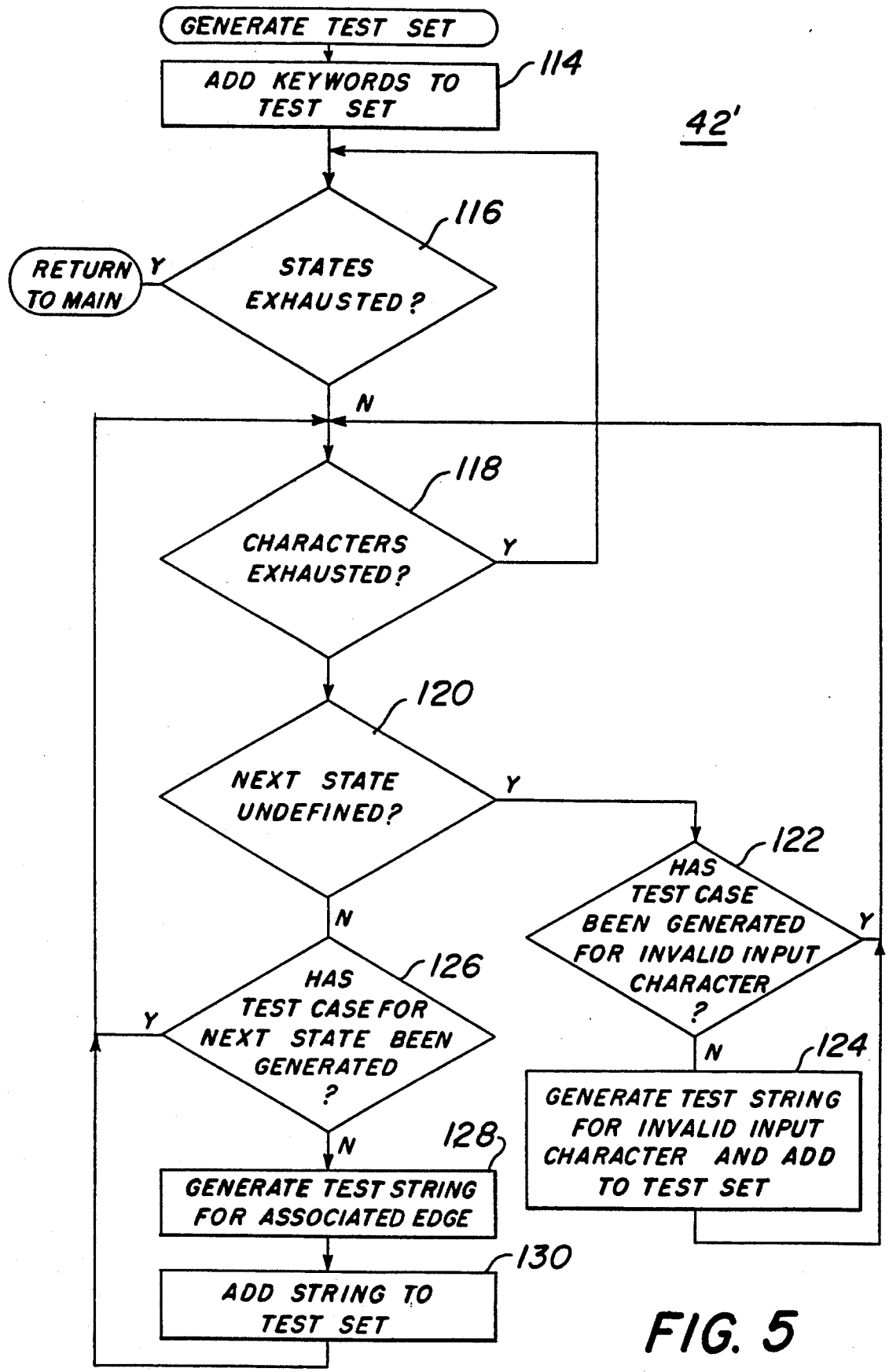
FIG. 5 is a detailed flowchart of the "Generate Test Set" block of FIG. 2B.

Section D describes the "Generate Test Set" routine illustrated in FIG. 5. Corresponding exemplary pseudo code is provided in Appendix D.

Section E describes the "Build Prefix List" routine. Corresponding exemplary pseudo code is provided in Appendix E.

Figure 6A:
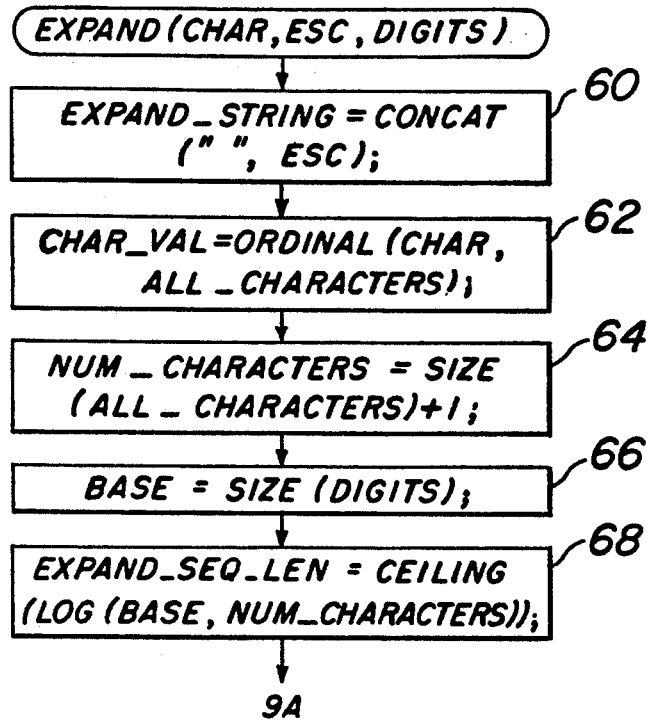
FIGS. 6A and 6B are a flowchart of an expansion sequence builder according to the invention.
Figure 6B:
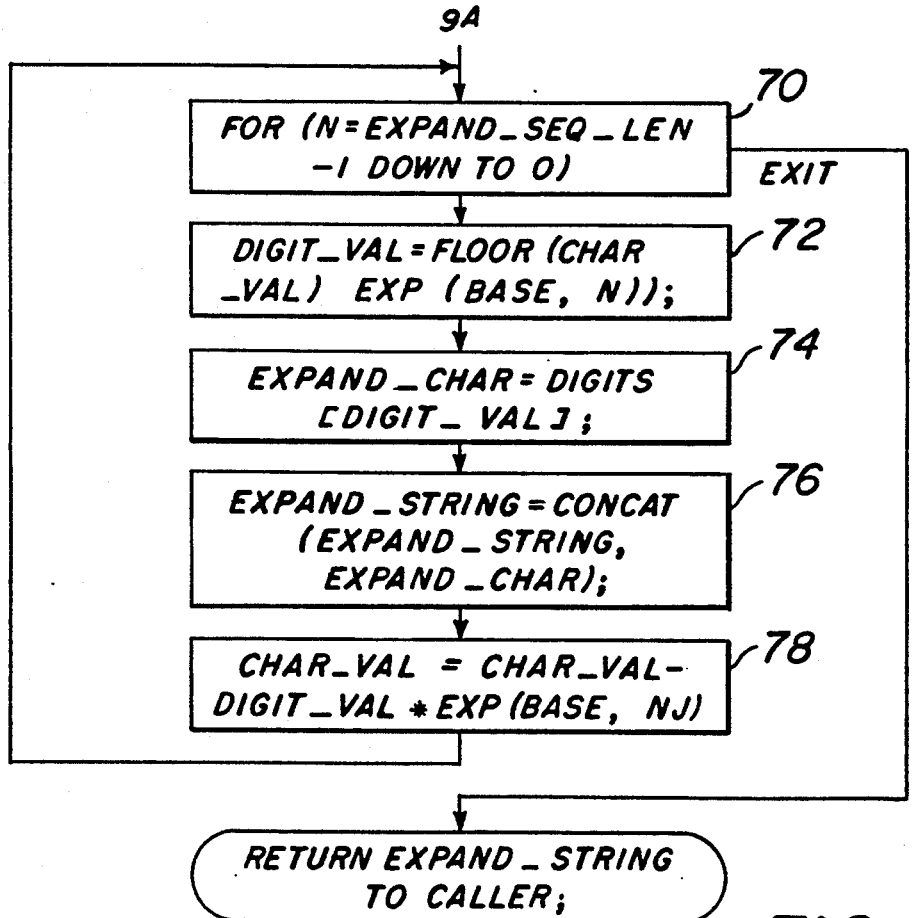

Section F describes the "Expansion Sequence Builder" routine illustrated in FIGS. 6A and 6B.

It should be noted that in the pseudo code provided in the appendices the operator "=" represents equivalent comparison assignment and the operator "!=" represents not equal.

A. MAIN

Referring now to FIGS. 2A and 2B, Main begins by defining global values, or constants, block 10. As can be seen from the corresponding pseudo code in Appendix A, these global values include the following (see Appendix A) "empty_set" is the set containing no elements (where a set is defined as a group of associated values); "nul-char-value" is the character value zero; and "all_characters" is the set of all representable characters (currently the character values 1 through 255 including ASCII values). The value all_characters defines the character set used for translating source labels to target labels. Most preferably, these values will be 8-bit binary values, although 7-bit or 16-bit characters are also contemplated. (Of course, the invention is not limited to 8, 7, or 16-bit characters.)

Next, at block 12, major block functions are defined. The major block functions are "parser", "re_to_nfa", "nfa_to_dfa", and "minimize_dfa". These functions are described in Appendix A.

Next, at block 14, state machine (SM) functions are defined. The SM functions include "init_state(dfa)", "accepting(dfa,S)", and "next_state(dfa,S,C)". The routines init-state, accepting, and next_state provide means for exercising a SM. These functions are further defined in Appendix A.

At block 16 the Set functions "delete (E,S)", "element (E,S)", "ordinal(E,S)", and "size(S)" are defined. These routines too are defined in Appendix A from lines 20-42.

Next, at block 18, the String functions "concat(S,C)" and "size(S)" are defined. The function concat(S,C) concatenates the character "C" to the end of the string "S". The function size(S) provides the length, in characters, of string S.

At block 19 the Numeric functions "ceiling(N)", "log(B,N)", "floor(N)", and "exp(B,N)" are defined. These are mathematical functions and are adequately described in Appendix A.

Blocks 20 through 42 present a broad overview of a method of validating a label translator according to the present invention. Block 20 verifies that a TC exists and is accessible. Next, the TC is parsed to identify syntactic errors (if any) and build the "Regular Expression", "Escape Character", "Digits", and "Keywords" data sets, block 22.

Next, at blocks 24, 26 and 28, the RE set is translated to a minimal dfa (SM). Although this translation could be performed in fewer steps, in the preferred embodiment it is broken down into the steps of converting the RE to an nfa, block 24; converting the nfa to a dfa, block 26; and minimizing the dfa, block 28. The translation is performed in three steps so that relatively simple steps can be used, and errors of implementation may be avoided.

At block 30 a prefix list is constructed. This prefix list is described in more detail in Section E below. For now, it suffices to say that the prefix list provides a means for providing the user a useful description of any errors. This is necessary because semantic analysis (block 32) is performed on the SM rather than the TC. (Ordinarily, semantic analysis would be performed immediately after parsing (block 22), and prior to conversion of the RE to an SM.)

Next, at block 32, the TC is analyzed by examining the SM. The "Analyze Configuration" block 32 is further explained in Section B below, with reference to FIG. 3.

At block 34 a translator is generated. This task essentially consists of appropriately outputting the SM, escape character, digit characters, and keywords. Since translator generation is both well known and not essential to the invention, it is not described in detail herein.

Next, at step 36, if requested by the user, a test set is generated according to the methods described in Sections C ("Generate Exhaustive Test Set") and D ("Generate Test Set") below. If, at step 38, an exhaustive test set is requested, block 40 is executed. If a standard (i.e., nonexhaustive) test set is requested, block 42 is executed.

It should be apparent that the "Analyze Configuration" module, block 32, is of primary importance in carrying out the invention. This block will now be described in detail.

B. ANALYZE CONFIGURATION

Referring now to FIG. 3, the "Analyze Configuration" module comprises several distinct tests: First, all keywords (called "reserved words" in some languages) are tested to ensure that they are valid according to the valid RE provided by the user, block 80. Corresponding pseudo code for this block is provided in Appendix B. Note that the pseudo code provides a simple example of how a state machine can be used to validate a label. This same basic approach is expanded to accomplish translation.

Next, a valid escape character set is determined, block 82. Since an escape sequence may have to be inserted at any state in the SM, the escape character must be a valid input at any SM state. This module finds all characters which meet that criteria and are therefore valid candidates for the escape character. The pseudo code corresponding to block 82 (Appendix B) implements a simple routine whereby all characters are assumed to be valid escape characters. Then all assumed valid escape characters ("valid_esc_set" in the code) are checked and tested at each SM state. A character which is found to be invalid at any state is removed from the set. The resultant set will always be valid.

Next, the validity of the user specified escape character is determined, block 84. Corresponding pseudo code is provided in Appendix B. According to the invention, if the valid escape character set is empty, it will not be possible to construct a translator. This unlikely occurrence will arise when different parts of a label have different valid character sets; for example, when labels must be letters followed by numbers. Since such label requirements are not common, this is not expected to occur very often. If the user specified escape character is not a member of the valid escape character set, the escape character is not valid.

Next, the digit characters are tested to determine whether any of the digit characters is the same as the escape character, block 86. Pseudo code for this block is provided in Appendix B. Although use of the escape character as a digit character does not present a problem in generating a translator, it is undesirable because it makes the resulting labels less readable for humans. Note that duplicate digit characters are not permitted because they would make reverse translations ambiguous.

Next, the set of SM states where digit characters might need to be valid is determined, block 88.

Next, the set of valid Digit characters is determined, block 90. Corresponding pseudo code is provided in Appendix B. Determining the set of valid digit characters begins by assuming that all characters are valid. The set of known valid Digit characters is reduced by an iterative method until the set of SM states for which a digit character might need to be valid becomes stable. This iterative approach is necessary since an escape sequence might consist of multiple Digit characters.

According to the invention, invalid digit characters are removed from the set of valid digit characters ("valid_digits_set") by analyzing each combination of potentially valid digit character (in "valid_digits_set") and SM state (in "digit_state_set"). Since an escape sequence typically contains multiple digit characters, it is necessary to add all states which can be reached with digit character inputs to the set of states being analyzed ("new_digit_state_set").

Next, each digit character (in "digits" set, Appendix B) is tested to determine whether all digit characters may be simply shown to be valid, block 92. If all digit characters are not determined to be valid by this simple test, an exhaustive analysis is performed at block 94. Pseudo code for performing this exhaustive analysis is provided in Appendix B. Note that failure to validate all digit characters by the simple method does not conclusively indicate that the TC is invalid. A final decision on this requires an exhaustive analysis of all expansion possibilities. If the exhaustive analysis later shows the TC to be invalid, the valid digits set will provide useful information for creating a valid TC to assist the user.

The exhaustive analysis is accomplished by testing each combination of SM state and input character. If an input character is not a valid input for some state, that character may be expanded into an escape sequence. Since an escape sequence may be needed, that specific sequence must be valid at the state being analyzed.

As shown in the pseudo code, one way of carrying out the exhaustive analysis indicated at block 94 is to iterate through the escape sequence one character at a time. If any character in the escape sequence is found to be invalid for the state which handles that part of the sequence, the configuration is declared invalid and processing is terminated.

Showing that all input character strings may be translated into valid input sequences for the SM does not ensure that all translations will be successful. Thus, in order to show that all translations will succeed, an analysis is performed at block 96 to demonstrate that an accepting state will always be reached. Since not all SM states will necessarily be accepting states, it is sometimes necessary to append a suffix string one or more times to the end of a translated label to reach an accepting state. A pseudo code module for carrying out block 96 is provided in Appendix B.

Note that although the user could be allowed to specify a more general suffix string, it will generally be sufficient to use the escape sequence for the character zero as the suffix string. Note also that this test is performed for each SM state by constructing the set of states which can be reached from that state by use of the suffix string. The set "suffix_state_set" is used in the pseudo code.

According to the invention, as long as an accepting state is not reached, additional copies of the suffix string are appended to the end of the translated label. If, after application of the suffix string, the SM is left in a state which has been previously visited (i.e., which is in suffix_state_set), an accepting state will never be reached. This is reported to the user and processing is terminated. If the SM is left in a new (or unvisited) state, hope remains that additional suffix string applications will lead to a final state.

Finally, when and if block 98 is reached, the translation configuration is declared valid, and control is returned to Main.

Returning momentarily to FIG. 2B, the "Generate Translator" module, block 34, follows the above described TC analysis. Methods for generating the translator are well known to those skilled in the art. Accordingly, block 34 will not be described in detail. Sections C and D below describe the "Generate Exhaustive Test Set" module, block 40, and the "Generate Test Set" module, block 42, respectively.

C. GENERATE EXHAUSTIVE TEST SET

Referring now to FIG. 4, the "Generate Exhaustive Test Set" module will now be described.

When requested, an exhaustive test set is generated by the routine "gen_exhaustive_test_set" (see Appendix C for pseudo code). This test set is built by first adding all keywords to an empty set, block 100. Since keywords are handled in the translator separately from the state machine, it is important that the keyword checking function be tested. A check is made to determine whether all states and characters have been exhausted, steps 102, 104, and if so, control is returned to Main.

Next, all combinations of state and input character are tested, block 106. This is accomplished by concatenating all combinations of prefix strings and characters. The prefix strings cause the SM to go to the correct state to perform the character tests. Once all these test cases are added to the test set, block 108, test set construction is complete and control is returned to the main routine.

D. GENERATE TEST SET

Referring now to FIG. 5, the "Generate Test Set" module will now be described.

When requested, a standard test set is generated by the routine "gen_test_set" (see Appendix D). This test set contains fewer test cases than an exhaustive test set for the equivalent TC. This is due to a categorical test approach which selects one representative test case from each class of tests. As before, construction of the test set begins by adding all keywords to the test set, block 114.

Next, a check is made to determine whether all states, block 116, and all characters, block 118, have been exhausted. If so, control is returned to Main. Next, a check is made of whether the next state is undefined, block 120. If not, block 126 is executed; if so, block 122 is executed.

For each state, one test case character is generated for each different next state, block 128. This test string is then added to the test set, block 130. Next, a test case is generated for an invalid input character, block 124, if such a character exists, as determined in block 122. The variables "tested_state_set" and "tested_bad_char" keep track of which test cases have already been generated for the current state. The first input character found to be invalid for a given state is selected for the invalid character test case.

If a new next state is found, block 126, (and a test case has not yet been generated for that next state) a test set is generated to test the edge leading to that state, block 128. The fact that the test set for that edge has been generated is noted by adding the associated next state to "tested_state_set", block 130. This prevents generation of additional test cases for that edge. Once all test cases have been determined, control is returned to Main.

E. BUILD PREFIX LIST

As discussed above, a prefix string list is used to map SM states to user understandable codes for error reporting. This prefix string list is an array of strings with one element for each state in the minimal dfa (SM). Each string element is the shortest string which causes the SM to end up in the associated state. Pseudo code for building a prefix list is provided in Appendix E.

Prefix strings are determined by a simple iterative method which is effective for the small SMs which are typical in label translation. For larger SMs, a recursive procedure which builds a spanning tree for the SM would be more efficient.

The prefix string for the initial state is a zero length string (see line 5, p. 31). States for which a prefix string has already been generated are recorded in "prefixed_state_set".

According to the invention, new states are arrived at by starting at all of the different states already reached, and trying all possible inputs. Since the prefix string list contains a record of how to get to all reached states, it is possible to build an input sequence to get to any new state which is found. This is done by concatenating the input used to the end of the prefix string associated with the state used to reach the new state.

When no more new states can be reached, the algorithm is finished. When this occurs, all states will have been reached, provided the SM contains no isolated states (which is known to be the case for a minimized dfa).

F. EXPANSION SEQUENCE BUILDER

Referring now to FIGS. 6A and 6B, an expansion sequence builder routine according to the invention comprises the steps shown. Because the routine is straightforward, the flowchart of FIGS. 6A and 6B employs pseudo code statements in the respective blocks.

The routine "expand(char, esc, digits)" handles potentially invalid characters by mapping them to an escape sequence. These escape sequences comprise an escape character followed by one or more digit characters which encode the character value.

First, at block 60, the escape sequence "expand_string" is initialized by setting it equal to the null character concatenated with the escape character. At block 62, the character value ("char_val") is determined.

Next, the integer value "num_characters", block 64, is specified to be one or more than the number of elements in all characters since the character value zero is reserved for use as a suffix string and was therefore not a member of all characters. The numeric base ("base") for encoding character values is defined by the number of characters in the "digits" string, block 66. The expansion sequence length ("expand_seq_len"), which is always constant for a particular character system and "digits" string combination, is computed at block 68. This is necessary for reverse translation.

The loop shown in FIG. 6B (i.e., blocks 70, 72, 74, 76, 78) represents a common number to string conversion technique, and need not be explained in detail except to note that the generated digit characters are concatenated to construct the escape sequence "expand_string", block 76. When the expansion sequence is complete, control is returned to Main.

To summarize, a method and corresponding computer code for validating a label translation configuration according to the present invention have been described. According to the invention, once the TC has been validated, a test set is automatically generated if requested by the user. The test set may be either an exhaustive test set or a standard test set.

EXAMPLE

An exemplary program embodying the invention first constructs the one minimal deterministic finite automata (another name for a state machine) equivalent to the user specified regular expression for valid labels in the target language. As an example, the regular expression specification for valid VHDL labels will be used:

label=[A-Z] ([_]? [A-Z0-9])*

(See the aforementioned Aho et al. reference, for an explanation of this regular expression syntax.)

The TC for valid VHDL labels would be translated to the following minimal deterministic finite automata (state machine):

separating verification of the expansion character from verification of the digit characters. However, the real value of this method is in suggesting alternative configurations when the user specified configuration fails its analysis.

The second is to generate all expansion sequences and verify that those expansion sequences are acceptable to the SM.

The following list contains all valid expansion sequences for 8 bit characters (note that 8 bit characters may be specified using 2 Digit characters since there are 16 distinct digit character values):

```
Z00 Z01 Z02 Z03 Z04 Z05 Z06 Z07 Z08 Z09 Z0A Z0B Z0C Z0D Z0E Z0F
Z10 Z11 Z12 Z13 Z14 Z15 Z16 Z17 Z1S Z19 Z1A Z1B Z1C Z1D Z1E Z1F
Z20 Z21 Z22 Z23 Z24 Z25 Z26 Z27 Z28 Z29 Z2A Z2B Z2C Z2D Z2E Z2F
Z30 Z31 Z32 Z33 Z34 Z35 Z36 Z37 Z38 Z39 Z3A Z3B Z3C Z3D Z3E Z3F
Z40 Z41 Z42 Z43 Z44 Z45 Z46 Z47 Z48 Z49 Z4A Z4B Z4C Z4D Z4E Z4F
Z50 Z51 Z52 Z53 Z54 Z55 Z56 Z57 Z58 Z59 Z5A Z5B Z5C Z5D Z5E Z5F
Z60 Z61 Z62 Z63 Z64 Z65 Z66 Z67 Z68 Z69 Z6A Z6B Z6C Z6D Z6E Z6F
Z70 Z71 Z72 Z73 Z74 Z75 Z76 Z77 Z78 Z79 Z7A Z7B Z7C Z7D Z7E Z7F
Z80 Z81 ZS2 Z83 Z84 ZS5 Z86 ZS7 ZSS Z89 ZSA ZSB ZSC ZSD Z8E Z8F
Z90 Z91 Z92 Z93 Z94 Z95 Z96 Z97 Z98 Z99 Z9A Z9B Z9C Z9D Z9E Z9F
ZA0 ZA1 ZA2 ZA3 ZA4 ZA5 ZA6 ZA7 ZA8 ZA9 ZAA ZAB ZAC ZAD ZAE ZAF
ZB0 ZB1 ZB2 ZB3 ZB4 ZB5 ZB6 ZB7 ZB8 ZB9 ZBA ZBB ZBC ZBD ZBE ZBF
ZC0 ZC1 ZC2 ZC3 ZC4 ZC5 ZC6 ZC7 ZC8 ZC9 ZCA ZCB ZCC ZCD ZCE ZCF
ZD0 ZD1 ZD2 ZD3 ZD4 ZD5 ZD6 ZD7 ZD8 ZD9 ZDA ZDB ZDC ZCD ZCE ZCF
ZE0 ZE1 ZE2 ZE3 ZE4 ZE5 ZE6 ZE7 ZE8 ZE9 ZEA ZEB ZEC ZED ZEE ZEF
ZF0 ZF1 ZF2 ZF3 ZF4 ZF5 ZF6 ZF7 ZF8 ZF9 ZFA ZFB ZFC ZFD ZFE ZFF
```

State 0: (initial state, not a final state) input [A-Z] causes transition to state 1

State 1: (a final state) input [A-Z0-9] causes transition to state 1 input [_] causes transition to state 2

State 2: (not a final state) input [A-Z0-9] causes transition to state 1

Configuration analysis to determine if the specified expansion characters (escape and digits) will always be valid is accomplished by use of this state machine. There are two ways to perform this verification. The following exemplary translator configuration is used:
escape="Z"
digits="0123456789ABCDEF".

The first method of verification is to determine the set of valid expansion characters and verify that the specified expansion characters are a subset of the valid expansion characters. The set of valid expansion characters is the intersection of the valid expansion characters sets for each state in the machine. The set of valid expansion characters for a state is the union of the character sets of all transitions from that state to a valid state. In the example, the valid expansion character sets for the states would be the following:

State 0=(ABCDEFGHIJKLMNOPQRSTUVWXYZ)
State 1=(ABCDEFGHIJKLMNOPQRSTUVWXYZ0123456789)
State 2=(ABCDEFGHIJKLMNOPQRSTUVWXYZ0123456789)

The overall valid expansion character set, found by intersecting these sets, would be the following:

(ABCDEFGHIJKLMNOPQRSTUVWXYZ)

This approach would find the specified configuration invalid. This is because this approach is more restrictive than the second. The increased restrictions are due to the requirement of supporting any expansion character sequence instead of only those necessary for translation. These restrictions can be largely reduced by a more complex application of the approach; specifically, by These expansion sequences are applied to the SM starting at each state in the machine. The specified configuration is acceptable if and only if the state machine is always left in a valid state (i.e., a state from which zero or more applications of the sequence Z00, the expansion sequence for the character value 0, will leave the state machine in a final state). Since this example SM has 3 states and 256 possible expansion sequences, 768 test cases would be necessary to verify that the example configuration is valid.

An important feature of this exemplary program, and of the invention, is automatic test set generation. These test labels are intended to be included in data to be translated during testing to verify that the generated label translator was correctly installed and is properly functioning. The goal of the generated test set is to ensure that each state transition is tested. An alternative, more complete, goal is to test each state and input character pair combination.

For the example translation, state 1 would require the following test inputs:

(a) transition testing=one of [A-Z0-9], _, and one other character; (standard test) or
(b) all input testing=each 8 bit character (256 cases). (exhaustive test)

The challenge for test set generation is not what input characters to test, it is how to get the SM into the specified state. To get the SM into a particular state, prefix sequences are used. These prefix sequences are determined by iterative SM analysis or generation of a spanning tree through a recursive method. For the example SM, the following prefix sequences might be generated:
State 0=""
State 1="A"
State 2="A_"

Note that because different inputs cause the same state transition, there may be multiple equivalent prefix sequences for a particular state.

Label translator configurations (TC) are typically constructed in an ad-hoc manner and are verified via standard software engineering methods (design reviews, code reviews, code coverage analysis, etc.). The invention, as illustrated in the exemplary program, introduces a new approach by automatically analyzing a label translator configuration and generating a test set to verify correct translator operation for any implementation. In addition, the generated label translator is guaranteed to never fail (except for label length limitations). A final feature is that translated labels can be reverse translated to allow later data correlation.

Although particular embodiments have been described, many variations thereof will still be within the scope of the invention. Accordingly, the invention is intended to be limited only by the appended claims.

APPENDIX A

```
// Reference [1]
// "Compilers; Principles, Techniques, and Tools"
// Written by: Alfred V. Aho, Ravi Sethi, and Jeffrey D. Ullman
// Published by: Addison-Wesley Publishing Company
// ISBN 0-201-10088-6

// Global Value Definitions                              (block 10)
   empty_set = The set containing no elements.

nul_char_value = The character value zero.

all_characters = The set of all representable characters
                    (currently this is the character values
                     41 through 255 including ASCII values).

undefined = Non-value value (indicates does not exist or not
   found).

// Pre-existing Major Block Functional Definitions    (block 12)
   parser(config_file, re, esc, digits, keywords)
   {
      This routine reads the translation configuration (TC) file,
      verifies that the translation configuration is valid,
      and extracts the regular expression (re),
      escape character (esc), digit characters (digits),
      and keywords data.
   } re_to_nfa(re)
   {
      This routine converts a regular expression (re) to
      a non-deterministic finite automata using the technique
      described in [1] section 3.7. The non-deterministic finite
      automata is returned to the caller.
   } nfa_to_dfa(nfa)
   {
      This routine converts a a non-deterministic finite
      automata (nfa) to a deterministic finite automata
      using the technique described in [1] pages 117 to 121.
      The deterministic finite automata is returned to the caller.
   } minimize_dfa(dfa)
   {
      This routine minimizes the number of states of a deterministic
      finite automata (dfa) using the technique described in [1]
      pages 141 to 144. The minimized deterministic finite automata
      is returned to the caller.
   }
```

```
// State Machine Functional Definitions                    (block 14)
init_state(dfa)
{
    This routine indicates the initial (or starting) state of a
    deterministic finite automata (dfa).
} accepting(dfa, S)
{
    This routine determines if state S of deterministic finite
    automata dfa is an accepting (or final) state.
} next_state(dfa, S, C)
{
    This routine determines what state in the deterministic finite
    automata dfa is pointed to by the edge from state S with the
    label matching input character C. If no such state exists the
    value undefined is returned (see [1] page 100 paragraph
    starting "One state ...").
}

// Set Functional Definitions                              (block 16)
add(E, S)
{
    This routine adds element E to set S.
} delete(E, S)
{
    This routine removes element E from set S.
} element(E, S)
{
    This routine indicates whether or not E is an element of set
    S.
} ordinal(E, S)
{
    This routine indicates the member number (position) of element
    E in set S (e.g. ordinal(first element) = 1, ordinal(second
    element) = 2, etc.).
} size(S)
{
    This routines indicates the number of elements in set S.
}

// String Functional Definitions                           (block 18)
concat(S, C)
{
    This routine concatenates character C to the end of string S.
} size(S)
{
    This routines indicates the number of elements in string S.
}

// Numeric Functional Definitions                          (block 19)
ceiling(N)
```

```
        This routine rounds N up to the next larger integer value
        (e.g. ceiling(2.75) = 3, ceiling(5.01) = 6, ceiling(2.0) = 2).
} log(B, N)
{
    This routine calculates the log base B of N (e.g. log(16, 256)
    = 2).
} floor(N)
{
    This routine rounds N down to the next smaller integer value
    (e.g. floor(7.99) = 7, floor(5.2) = 5, floor(2.0) = 2).
} exp(B, N)
{
    This routine calculates B to the N (e.g. exp(16, 2) = 256).
}

// Execution manager (main routine)
main(config_file)
{
    verify config_file exists and is accessible;        // (block 20)
    parser(config_file, re, esc, digits, keywords);     // (block 22)

nfa = re_to_nfa(re);                                // (block 24)
    dfa = nfa_to_dfa(nfa);                              // (block 26)
    min_dfa = minimize_dfa(dfa);                        // (block 28)

build_prefix_list(dfa, prefix);                     // (block 30)

analyze_config(min_dfa, esc, digits, keywords,      // (block 32)
                   prefix);

generate translator;                                // (block 34)

if (a test set was requested)                       // (block 36)
    {
    if (an exhaustive test set was requested)           // (block 38)
        gen_exhaustive_test_set(min_dfa,                // (block 40)
                    esc, digits, keywords,
                    prefix, test_set);
      else
          gen_test_set(min_dfa,                         // (block 42)
                    esc, digits, keywords,
                    prefix, test_set);
    } processing complete;
}
```

APPENDIX B

```
// Translation configuration (TC) analyzer
    analyze_config(min_dfa, esc, digits, keywords, prefix)
{
// check validity of keywords                          (block 80)
    for (keyword = each string in keywords)
    {
        state = init_state(min_dfa);
        for (char = each character in keyword)
```

```
        {
            if (next_state(min_dfa, state, char) = undefined)
            {
                report keyword is not a valid label;
                skip to next keyword;
            }
            state = next_state(min_dfa, state, char);
        }
    }

// determine valid escape character set            (block 82)
    valid_esc_set = all_characters;

for (state = each state in min_dfa)
    {
        for (char = each character in valid_esc_set)
        {
            if (next_state(min_dfa, state, char) = undefined)
                delete(char, valid_esc_set);
        }
    }

// determine if specified escape character is valid (block 84)
    if (valid_esc_set = empty_set)
    {
        report there are no valid esc character possibilities
        report a translator can not be constructed
        report either another translation technique is needed
                or the valid label regular expression is incorrect
        terminate processing
    } if (not element(esc, valid_esc_set))
    {
        report esc is invalid and must be changed
        report esc must be selected from the set valid_esc_set
        terminate processing
    }

// static analysis of digit characters            (block 86)
    for (digit = each character in digits)
    {
        if (digit = esc)
        {
            report esc may not also be a digit character
            terminate processing
        }
    } if (there are duplicate characters in digits)
    {
        report each digit character must be distinct
        terminate processing
    }

// determine digit expansion state set            (block 88)
    digit_state_set = empty_set;
    for (state = each state in min_dfa)
    {
        if (not element(next_state(min_dfa, state, esc),
                        digit_state_set))
            add(next_state(min_dfa, state, esc), digit_state_set);
    }
```

```
// determine valid digit characters set                    (block 90)
valid_digits_set = all_characters;

new_digit_state_set = digit_state_set;
digit_state_set = empty_set;
while (new_digit_state_set != digit_state_set)
{
    digit_state_set = new_digit_state_set;

for (state = each state in digit_state_set)
    {
        for (char = each character in valid_digits_set)
        {
            if (next_state(min_dfa, state, char) = undefined)
                delete(char, valid_digits_set);
        }
    } for (state = each state in digit_state_set)
    {
        for (char = each character in valid_digits_set)
        {
            if (next_state(min_dfa, state, char) != undefined)
            {
                if (not element(next_state(min_dfa, state, char),
                                new_digit_state_set))
                    add(next_state(min_dfa, state, char),
                        new_digit_state_set);
            }
        }
    }
}

// determine if digits can be simply shown valid           (block 92)
num_digits = size(digits);
num_valid_digits = 0;
for (char = each character in digits)
{
    if (element(char, valid_digits_set))
        num_valid_digits = num_valid_digits + 1;
}

// exhaustive analysis of expansion cases required         (block 94)
if (num_valid_digits != num_digits)
{
    for (state = each state in min_dfa)
    {
        for (char = each character in all_characters)
        {
            if (next_state(min_dfa, state, char) = undefined)
            {
                expand_state = state;

for (expand_char = each character
                                    in expand(char, esc, digits))
                {
                    if (next_state(min_dfa, expand_state,
expand_char)
                        = undefined)
                    {
                        report concat(prefix[state], char) can't
be
                                        translated;
```

```
                    report expand_char is not a valid digit;
                    report valid_digits_set are valid digits;
                    report there may be other valid digits;
                    terminate processing;
                }
                expand_state = next_state(min_dfa,
expand_state,
                                            expand_char);
            }
        }
    }
}

// see if auto-inserted suffix leads to acceptance    (block 96)
suffix_string = expand(nul_char_value, esc, digits);

for (state = each state in min_dfa)
{
    suffix_state_set = empty_set;
    add(state, suffix_state_set);

suffix_state = state;

while (not accepting(min_dfa, suffix_state))
    {
        for (char = each character in suffix_string)
        {
            suffix_state = next_state(min_dfa, suffix_state,
char);
        } if (element(suffix_state, suffix_state_set))
        {
            report prefix[suffix_state] can't be translated;
            report repeated concatenation of
                    expand(nul_char_value, esc, digits)
                    does not lead to a valid label;
            report a translator can not be constructed;
            report either another translation technique is needed
                    or the label regular expression is incorrect;
            terminate processing;
        } add(suffix_state, suffix_state_set);
    }
}

// translation configuration has been verified        (block 98)
    indicate success;
    return control to main routine;
}
```

APPENDIX C

```
// Generate exhaustive test set                              (block 40)
    gen_exhaustive_test_set(min_dfa, esc, digits, keywords,
    prefix, test_set)
{
    test_set = empty_set;

for (keyword = each string in keywords)
    {
    add(keyword, test_set);
```

```
}
    for (state = each state in min_dfa)
{
    for (char = each character in all_characters)
{
        test_string = concat(prefix[state], char);
    }
}
    test set construction complete;
    return control to main routine;
}
```

APPENDIX D

```
// Generate standard test set                                    (block 42)
   gen_test_set(min_dfa, esc, digits, keywords, prefix, test_set)
{
   test_set = empty_set;

for (keyword = each string in keywords)
{
        add(keyword, test_set);
} for (state = each state in min_dfa)
{
    tested_state_set = empty_set;
    tested_bad_char = FALSE;

for (char = each character in all_characters)
    {
    if (next_state(min_dfa, state, char) = undefined)
        {
            if (not tested_bad_char)
            {
                test_string = concat(prefix[state], char);
                add(test_string, test_set);
                tested_bad_char = TRUE;
            }
        }
        else if (not element(next_state(min_dfa, state, char),
                             tested_state_set)
        {
            test_string = concat(prefix[state], char);
            add(test_string, test_set);
            add(state, tested_state_set);
        }
    }
}
test set construction complete;
return control to main routine;
}
```

APPENDIX E

```
// State machine spanning prefix string list builder
build_prefix_list(dfa, prefix)
{
    prefixed_state_set = empty_set;
    prefix[init_state(dfa)] = "";
    add(init_state(dfa), prefixed_state_set);

new_prefixed_state_set = prefixed_state_set;
    prefixed_state_set = empty_set;
```

```
    while(new_prefixed_state_set != prefixed_state_set)
    {
        prefixed_state_set = new_prefixed_state_set;

for (state = each state in prefixed_state_set)
        {
            for (char = each character in all_characters)
            {
                if (next_state(dfa, state, char) != undefined)
                {
                    if (not element(next_state(dfa, state, char),
                                    new_prefixed_state_set))
                    {
                        prefix[next_state(dfa, state, char)] =
                            concat(prefix[state], char);
                        add(next_state(dfa, state, char),
                            new_prefixed_state_set);
                    }
                }
            }
        }
    }
    prefix string construction complete;
    return control to main routine;
}
```

I claim:

1. In a label translator, a method of validating a label translation configuration (TC) comprising the steps of:
   (a) defining a regular expression (RE) which specifies valid labels in a target language,
   (b) parsing the TC and converting the RE into a state machine;
   (c) analyzing the TC through the state machine;
   (d) determining the validity of the TC based upon the analysis of step (c), and providing an indication that the TC is invalid if the state machine remains in an undefined state as a result of the analysis of step (c); and,
   (e) automatically generating a set of test labels (test set) for testing the state machine; the TC defining a set of digit characters and an escape character, the escape character being valid anywhere in a target language label, and characters in a source language label which are determined to be illegal in the target language being converted into an escape sequence comprising the escape character followed by at least one of the digit characters.

2. Method according to claim 1 wherein step (d) further comprises the steps of:
   (i) determining a set of valid escape characters for the target language;
   (ii) determining whether the escape character defined by the TC is valid;
   (iii) determining a set of valid digit characters; and
   (iv) determining whether the digit characters defined by the TC are valid.

3. Method according to claim 2 wherein step (ii) comprises determining whether the escape character defined by the TC is one of the valid escape characters determined in step (i).

4. Method according to claim 2 wherein step (iv) comprises determining whether the set of digit characters defined by the TC is verifiable according to a first simplified method, and, if so, determining the validity of the digit characters according to the first simplified method, but otherwise determining the validity of each combination of character and state machine state and, in the event that a particular combination of character and state machine state is determined not to be valid, verifying the validity of an escape sequence expansion of said character at said state.

5. Method according to claim 1 wherein step (e) comprises generating a test case label for each transition of the state machine from one state to a next state, and for each state machine state, wherein each of said test case labels causes one of the state machine state and associated transition, and illegal input character combination to be exercised.

6. In a label translator, a method of validating a label translation configuration (TC) having a regular expression (RE) comprising the steps of:
   (a) parsing the TC and converting the RE into a state machine, the state machine being for translating a label from a source language to a target language;
   (b) analyzing the TC through the state machine; and,
   (c) determining the validity of the TC based upon the result of step (b) and providing an indication of the result;
   (d) automatically generating a set of test labels (test set) for testing a label translator implementation;
   wherein step (b) results in the state machine being placed in one of a defined or undefined state; and
   step (c) comprises providing an indication that the TC is invalid when, as a result of performing step (b), the state machine is placed in an undefined state, and further comprises:
   (i) determining a set of valid escape characters for the target language;
   (ii) determining whether the escape character defined by the TC is valid;
   (iii) determining a set of valid digit characters; and
   (iv) determining whether the digit characters defined by the TC are valid.

7. Method according to claim 6 wherein the TC defines a set of digit characters and an escape character.

8. Method according to claim 7 wherein the escape character is valid anywhere in a target language label and wherein characters in a source language label that are determined to be illegal in the target language are converted into an escape sequence comprising the escape character followed by at least one of the digit characters.

9. Method according to claim 6 wherein step (ii) comprises determining whether the escape character defined by the TC is one of the valid escape characters determined in step (i).

10. Method according to claim 6 wherein step (iv) comprises determining whether the digit characters defined by the TC are members of the valid digit characters determined in step (iii).

11. Method according to claim 6 wherein step (iv) comprises determining whether the digit characters defined by the TC are verifiable according to a first simplified method, and, if so, determining the validity of the digit characters according to the first simplified method, but otherwise determining the validity of each combination of character and state machine state and, in the event that a particular combination of character and state machine state is determined not to be valid, verifying the validity of an escape sequence expansion of said character at said state.

12. Method according to claim 6 wherein the step of automatically generating a test set comprises the step of generating a test case label for each transition of the state machine from one state to a next state, and for each state machine state, wherein each of said test case labels causes one of the state machine state and associated transition, and illegal input character combination to be exercised.

13. In a label translator, a method of validating a label translation configuration (TC), the TC defining a set of digit characters and an escape character and a regular expression (RE) describing valid labels in a target language, the method comprising the steps of:

(a) parsing the TC and converting the RE into the state machine;
(b) analyzing the TC through the state machine according to the following steps:
 (i) determining a set of valid escape characters for the target language;
 (ii) determining whether the escape character defined by the TC is valid;
 (iii) determining a set of valid digit characters; and,
 (iv) determining whether the validity of the digit characters defined by the TC is verifiable according to a first simplified method, and, if so, determining the validity of the digit characters according to the first simplified method, but otherwise determining the validity of each combination of character and state machine state and, in the event that a particular combination of character and state machine state is determined not to be valid, verifying the validity of an escape sequence expansion of said character at said state;
(c) determining whether the TC is valid based upon the result of step (b), the TC being determined to be invalid when the state machine remains in an undefined state as a result of performing step (b), and providing an indication of the result of the determination; and,
(d) automatically generating a set of test labels (test set) for testing the state machine, the test set comprising a test case label for each transition of the state machine from one state to a next state, and for each state machine state, wherein each of said test case labels causes one of the state machine state and associated transition, and illegal input character combination to be exercised;

the escape character defined by the TC being valid anywhere in a target language label, and characters in a source language label that are determined to be illegal in the target language being converted into an escape sequence comprising the escape character followed by at least one of the digit characters.

* * * * *